(12) United States Patent
Baker

(10) Patent No.: US 10,309,580 B1
(45) Date of Patent: Jun. 4, 2019

(54) UMBRELLA HOLDER

(71) Applicant: Kyle Baker, Bixby, OK (US)

(72) Inventor: Kyle Baker, Bixby, OK (US)

( * ) Notice: Subject to any disclaimer, the term of this patent is extended or adjusted under 35 U.S.C. 154(b) by 0 days.

(21) Appl. No.: 15/792,340

(22) Filed: Oct. 24, 2017

(51) Int. Cl.
| | |
|---|---|
| *A45F 3/44* | (2006.01) |
| *F16M 11/20* | (2006.01) |
| *F16M 11/04* | (2006.01) |
| *F16M 11/06* | (2006.01) |
| *F16M 11/24* | (2006.01) |
| *E04H 12/22* | (2006.01) |
| *F16C 11/10* | (2006.01) |

(52) U.S. Cl.
CPC .......... *F16M 11/2035* (2013.01); *A45F 3/44* (2013.01); *E04H 12/2215* (2013.01); *F16C 11/103* (2013.01); *F16M 11/041* (2013.01); *F16M 11/06* (2013.01); *F16M 11/24* (2013.01); *F16M 2200/022* (2013.01); *F16M 2200/024* (2013.01)

(58) Field of Classification Search
CPC .... F16M 11/2035; F16M 11/2042; A45F 3/44
See application file for complete search history.

(56) References Cited

U.S. PATENT DOCUMENTS

| | | | | | |
|---|---|---|---|---|---|
| 3,995,796 | A | * | 12/1976 | Kline | A45F 3/44 248/121 |
| 5,390,685 | A | * | 2/1995 | McCoy | A45B 17/00 135/19 |
| 6,490,823 | B1 | * | 12/2002 | Ibarra | A01K 97/10 248/512 |
| 6,726,160 | B1 | * | 4/2004 | Buchanan, Jr. | A45F 3/44 124/23.1 |
| 7,484,699 | B1 | * | 2/2009 | Ziegler | A45F 3/44 248/156 |
| 7,520,485 | B1 | * | 4/2009 | Giannetto | A01K 97/10 173/91 |
| 7,611,112 | B2 | * | 11/2009 | Lin | B60R 11/02 248/274.1 |
| 9,232,836 | B1 | * | 1/2016 | Zaccaro | E02D 5/80 |
| 9,675,146 | B1 | * | 6/2017 | Howell | F16M 11/28 |
| 2007/0164176 | A1 | * | 7/2007 | Liao | B60R 11/02 247/176.3 |
| 2009/0189030 | A1 | * | 7/2009 | Krasnicki | A45F 3/44 248/156 |
| 2009/0278020 | A1 | * | 11/2009 | Marcil | A45F 3/44 248/545 |
| 2010/0294900 | A1 | * | 11/2010 | Maurer | A45F 3/44 248/156 |
| 2011/0239376 | A1 | * | 10/2011 | Schmidt | A45B 3/00 7/167 |

\* cited by examiner

*Primary Examiner* — Bradley Duckworth
(74) *Attorney, Agent, or Firm* — Peacock Law P.C.; Justin R. Jackson

(57) ABSTRACT

An adjustable umbrella holder that most preferably includes three rotational joints, a quick connect, a base, an arm, and a connector that attaches to an umbrella. The joints are preferably configured to quickly and easily lock into a desired position. The quick connector permits the umbrella and a small portion of the umbrella holder to be detached from the rest of the umbrella holder so that a user can easily detach the umbrella and carry it around and then quickly and easily re-attach it. The umbrella holder can optionally feature different base types that can be attached for use in different environments.

17 Claims, 12 Drawing Sheets

UMBRELLA HOLDER

CROSS-REFERENCE TO RELATED APPLICATIONS

Not Applicable.

BACKGROUND OF THE INVENTION

Field of the Invention (Technical Field)

Embodiments of the present invention relate to an umbrella holder. More particularly, embodiments of the present invention relate to an umbrella holder which can be adjusted at several different locations to hold an umbrella in numerous different positions. Embodiments of the present invention are particularly useful for outdoor sporting events where it is desirable to shield oneself from the elements, including but not limited to sun, rain, and/or wind and are most preferably able to securely hold an umbrella in strong winds, thus providing an extreme weather umbrella stand.

Description of Related Art

Known positionable umbrella holders have numerous shortcomings. For example, some known umbrella holders can clamp onto a folding chair to provide shade and/or rain protection to a user. However, the clamping mechanisms on those known holders are cumbersome and generally accommodate only a very small range of tube diameters such that if a folding chair is formed from a larger or smaller diameter tube or for example is formed from a square or oval-shaped tube instead of a round tube, the clamp of the umbrella holder will either not attach securely or will not attach at all. Another problem with known clamping umbrella holders is that the folding chair to which it is attached is often prone to falling over when a user is not seated in the chair. This is because the umbrella and umbrella holder tend to make the chair very top heavy, and even the slightest breeze can exert a significant force on the top of the chair. Because the intended use of such known adjustable umbrella holders is to provide protection from the sun or rain, they are necessarily exposed to the elements of nature when in use.

Often, rain is accompanied by high winds. Because a deployed umbrella has a significant surface area, even moderate winds can generate significant forces throughout the structure of the adjustable connections and/or attachment points. Most adjustable umbrella holders provide adjustment at only one location. This means that the range of umbrella positions that are achievable through their use are very limited. People often use stationary umbrellas in several different manners. For example, one day, the user may be at a baseball game in mid-August and the outside temperature can be over 105 degrees Fahrenheit. It is thus desirable to place the umbrella between the user and the sun to provide shade. Of course, as the day progresses, the position of the sun changes relative to the user and so the user must be able to adjust the position of the umbrella.

In yet another instance, a user may be at a football game on a cold day with a strong wind blowing against his or her back. In this instance, the user will want to deploy the umbrella in a more horizontal orientation to shield him or herself from the cold wind. Of course, numerous other positions and heights of the deployed umbrella will be desirable based on factors that can include whether the user is sitting or lying on the ground, whether the user is sitting on a chair or bench and what type and size of a chair, or whether the user is standing, as well as the details of the weather during each such use.

In short, known umbrella holders are unable to securely hold an umbrella in virtually any position in high wind. Accordingly, there is thus a present need for an umbrella holder that can hold an umbrella securely-even in high winds and which can be adjusted so as to hold an umbrella in numerous positions, from ground level (for example, to block the wind for a user who is sitting on a blanket on the ground), to above a user's head when standing, including all heights in between (for example, when a user is sitting in a folding chair).

BRIEF SUMMARY OF EMBODIMENTS OF THE PRESENT INVENTION

An embodiment of the present invention relates to an umbrella holder having a base, first joint, an arm, a second joint, a quick connect mechanism, and an umbrella connector. The umbrella holder can include a third joint and/or an extension having ends configured to interface with respective halves of the quick connect mechanism. Optionally, the first joint can be disposed between the base and the arm. The first joint can optionally be disposed at a first end of the arm and the second joint can be disposed at a second end of the arm.

In one embodiment, the first joint can be disposed between the base and the arm, while the second joint can be disposed between the arm and the quick connect mechanism. The third joint can be disposed between the quick connect mechanism and the umbrella connector. The base can include a pair of ground spikes and/or it can comprise a length which is greater than a combined length of the first, second, and third joints and the arm. The umbrella holder can also include an umbrella that is removably attachable to the umbrella connector. In one embodiment, at least one of the first joint, the second joint or the third joint can have interfacing teeth and a fastener and is configured to locked that joint into a plurality of different positions.

An embodiment of the present invention relates to an umbrella holder having a first base, a first joint, an arm, a second joint, a third joint, and an umbrella connector. The umbrella connector can include at least a portion of a quick coupler. The first base can be communicably coupled to the first joint. The umbrella holder can also include a second base. The first base and the second base can be removably positionable.

In one embodiment, at least one of the first joint, the second joint or the third joint can have interfacing teeth and a fastener and can be configured to be locked into a plurality of different positions. At least one of the first joint, the second joint or the third joint can include a fastener having a cam lever. Optionally, the umbrella holder can include a guy-line having a stake coupled thereto. In one embodiment, a first end of the arm can include a portion of the first joint and a second end of the arm can include a portion of the second joint. Each of the portion of the first joint and the portion of the second joint can include teeth that are configured to permit the first joint and the second joint to each be locked into a plurality of positions.

An embodiment of the present invention also relates to method for positioning an umbrella including stepping on a base to force a pair of ground spikes into a ground surface; selecting at least one desired joint to manipulate from a selection of a first joint, a second joint and a third joint; manipulating the at least one desired joint to achieve a desired orientation of the umbrella; and adjusting at least one fastener to lock the selected joint into a desired orientation. The method can also include adjusting the position of the umbrella by installing a removably positionable extension.

Objects, advantages and novel features, and further scope of applicability of the present invention will be set forth in part in the detailed description to follow, taken in conjunction with the accompanying drawings, and will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
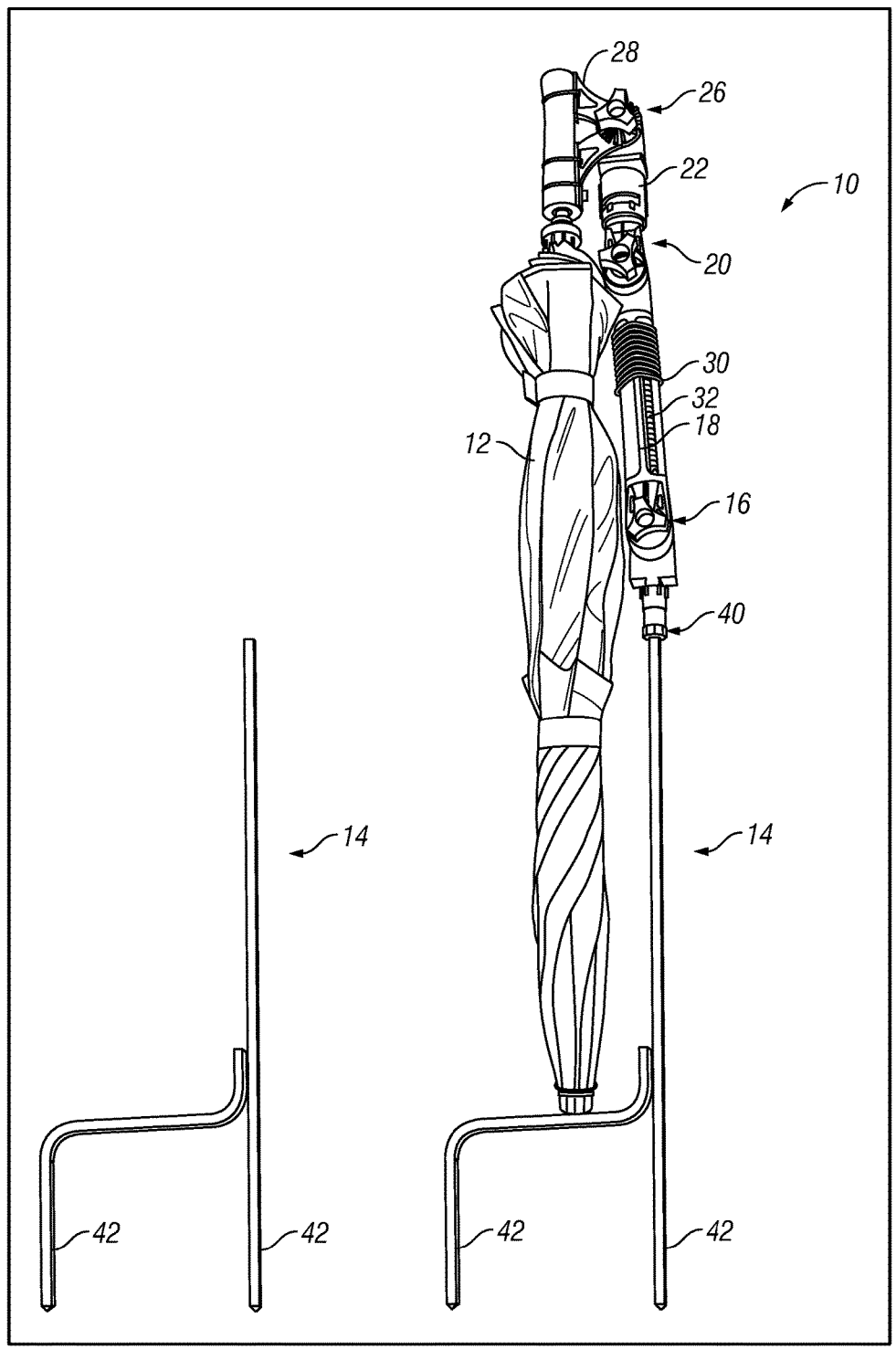
FIG. 1 is a drawing which illustrates an umbrella holder with an umbrella attached thereto and folded into a compact configuration for transport according to an embodiment of the present invention.
Figure 2:
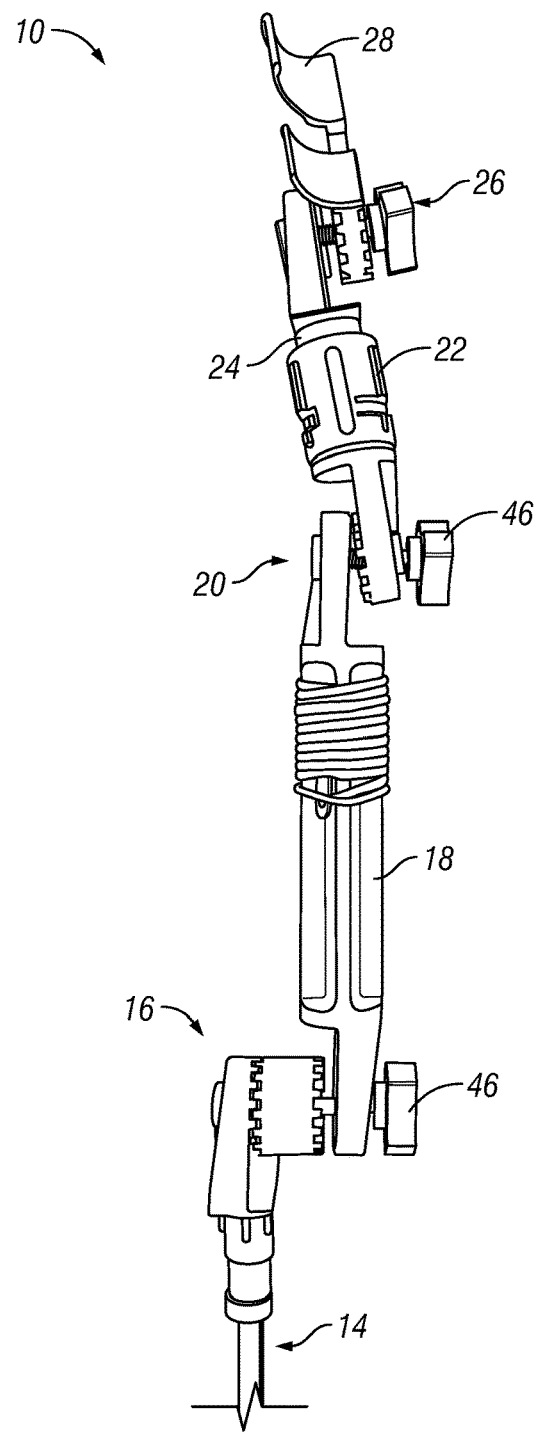
FIGS. 2 and 3 are drawings which respectively illustrate an embodiment of the present invention, without an umbrella attached thereto, in both an assembled and a partially disassembled state.
Figure 3:
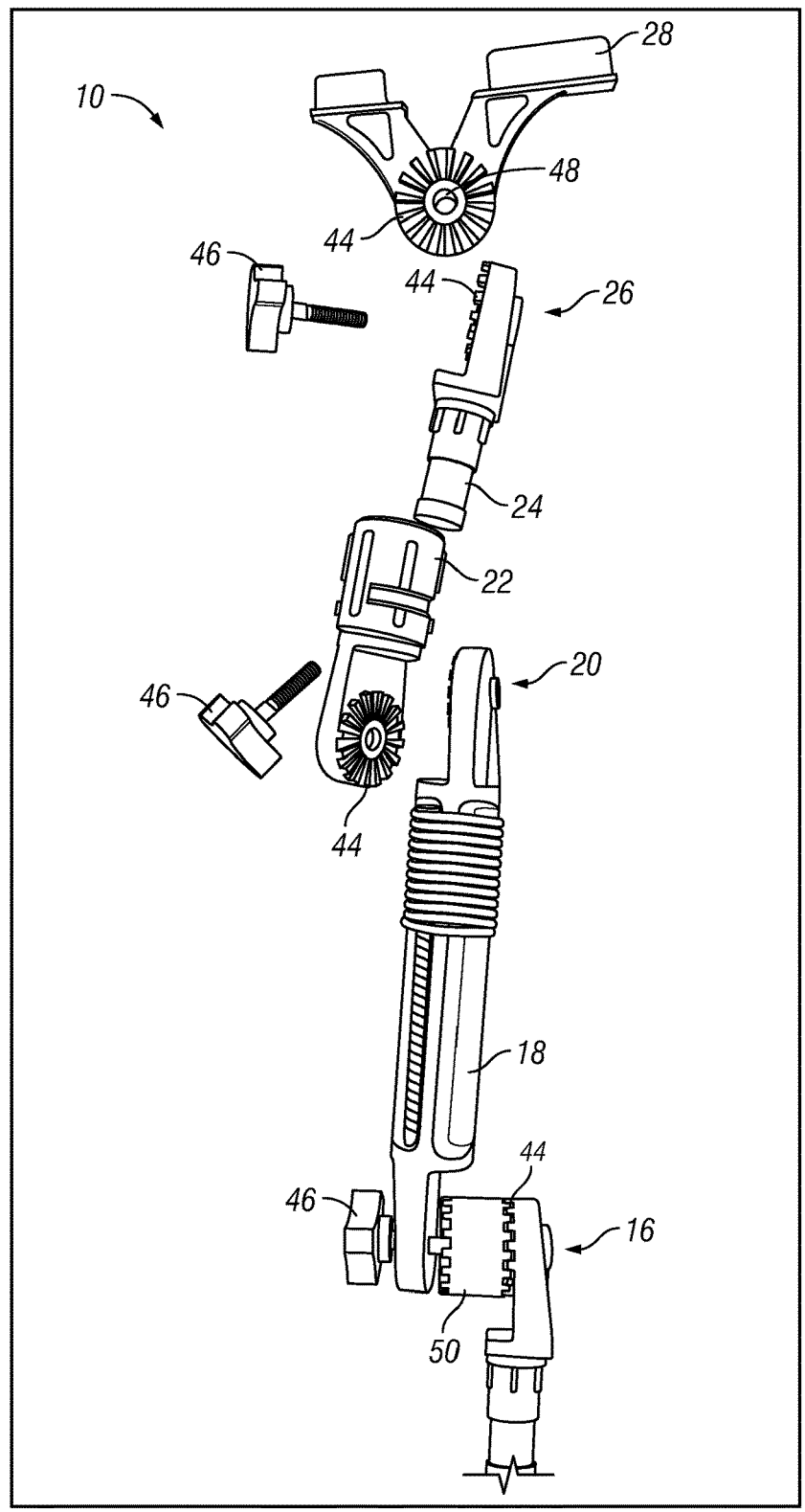

Referring now to the drawings, in one embodiment, umbrella holder 10, can hold umbrella 12 in a variety of positions and preferably comprises base 14, first joint 16, arm 18, second joint 20, female quick connect 22, male quick connect 24, third joint 26, umbrella connector 28. Optionally, guy-line 30 and stake 32 can be included and/or attached to umbrella holder 10—most preferably at arm 18.

Figure 8:
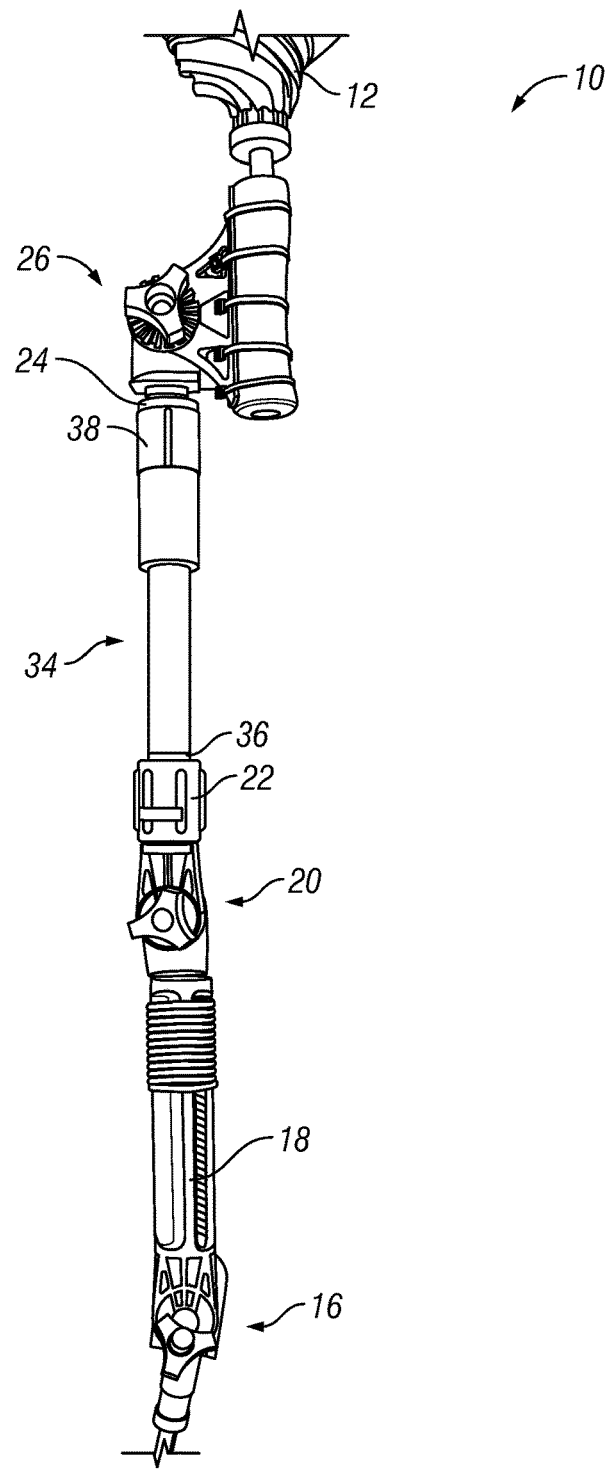
FIG. 8 is a drawing which illustrates an embodiment of the present invention with an extension disposed therein.
Figure 9:
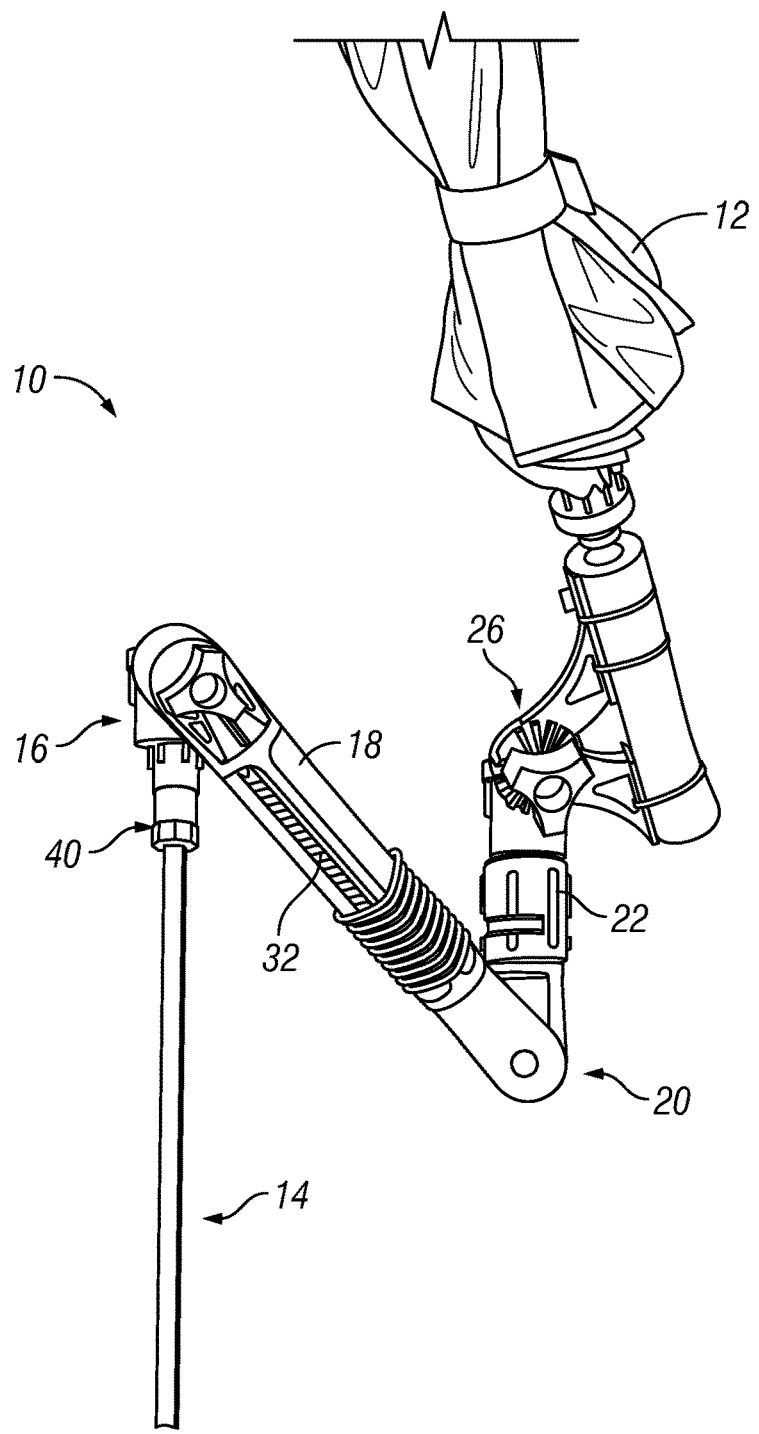
FIGS. 9-10 are drawings which illustrate a couple of the virtually unlimited number of configurations that are possible according to an embodiment of the present invention.
Figure 10:
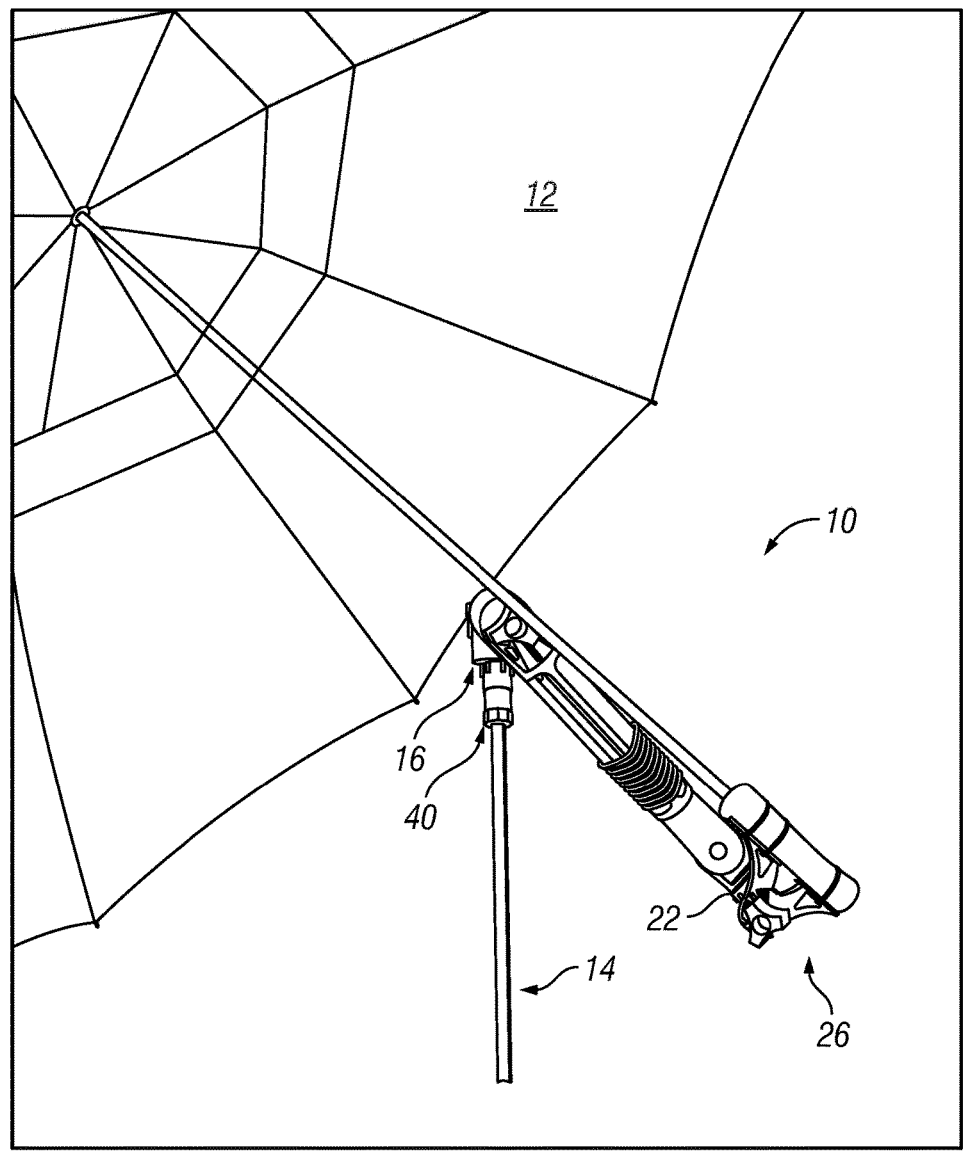

In one embodiment, as best illustrated in FIG. 8, extension 34 can optionally be provided. Although extension 34 can be configured to connect into any umbrella holder 10 at any desired location, in one embodiment, extension 34 preferably comprises male quick connect 36 on a first end and a female quick connect 38 on a second end of extension 34. In this embodiment, male quick connect 24 is most preferably connectable not only to female quick connect 22, but also to female quick connect 38. And, female quick connect 22 is also preferably connectable to male quick connect 36 such that extension 34 can easily be inserted between female quick connect 22 and male quick connect 24, when a user desires to use extension 34. Although in one embodiment, arm 18 and/or base 14 can be made sufficiently long so that a user can stand under umbrella 12 when umbrella holder 10 is in a substantially vertical orientation, in one embodiment, arm 18 and/or base 14 can be made shorter and a user can instead elect to use extension 34 to permit him or her to stand under umbrella. Of course, extension 34 can also be used to better accommodate other orientations and/or use settings or environments.

In one embodiment, base 14 can preferably be communicably coupled to first joint 16 via base connector 40. Base connector 40 preferably allows a user to connect different base types to umbrella holder 10. For example, in one embodiment, as best illustrated in FIG. 1, base 14 can comprise one or more ground stakes 42 such that a user can easily plunge ground stakes 42 into the ground and thus secure umbrella holder 10 at a location. Optionally, however, base 14 can comprise a base plate which allows umbrella holder 10 to be used at locations where the surface is not easily able to be penetrated by ground stakes 42, for example, in a parking lot, sidewalk, driveway or stadium seating. Alternatively, one or more clamps or other structures can be attached to or otherwise incorporated into base 14 to accommodate other use environments. For embodiments and use applications wherein ground stakes 42 are used, if exceptionally strong winds are experienced or expected which would tend to dislodge ground stakes 42, a user can optionally unwind guy-line 30 and apply guy-line stake 32 in a direction leading into the wind direction so that further support of umbrella holder 10 is provided. While optional guy-line 30 can be connected to umbrella holder 10 at any desired location, in one embodiment, guy-line 30 is preferably secured to an upper portion of arm 18.

As best illustrated in FIGS. 2-6, any one or more of first joint 16, second joint 20, and/or third joint 26 are preferably rotational joints and permit rotation about one or more axes. One or more of joints 16, 20, and/or 26 preferably capable of being locked into a position so that the locked joint(s) does not rotate until it is unlocked—thus permitting a user to place umbrella 12 into a desired position and it will be held there without moving. Most preferably one or more of the joints lock with sufficient strength such that even when umbrella 12 is deployed and a strong wind exerts a force against umbrella 12, it will be held without overcoming the holding force of the locked joint. While numerous shapes and configurations for one or more of joints 16, 20, and/or 26 can be used and will provide desirable results, they most preferably comprise interfacing teeth 44 which preferably mesh together and prevent rotation of the joint. In one embodiment, one or more of joints 16, 20, and/or 26 are preferably formed by two interfacing halves and are most preferably held together by fastener 46, which most preferably passes through one or more openings 48 disposed in each interfacing half. Most preferably fastener 46 comprises a threaded shaft with a large head that permits a user to easily secure the fastener with the user's hand without requiring any additional tools. Optionally one of the openings 48 can comprise threads formed therein and/or can comprise a nut inset therein such that fastener 46 can be screwed therein, thus holding the two halves of the joint together. Optionally, of course, a nut can be placed outside of the joint such that when the nut and fastener are screwed together, the two interfacing halves of the joint are sandwiched together and thus locked into position.

Figure 6:
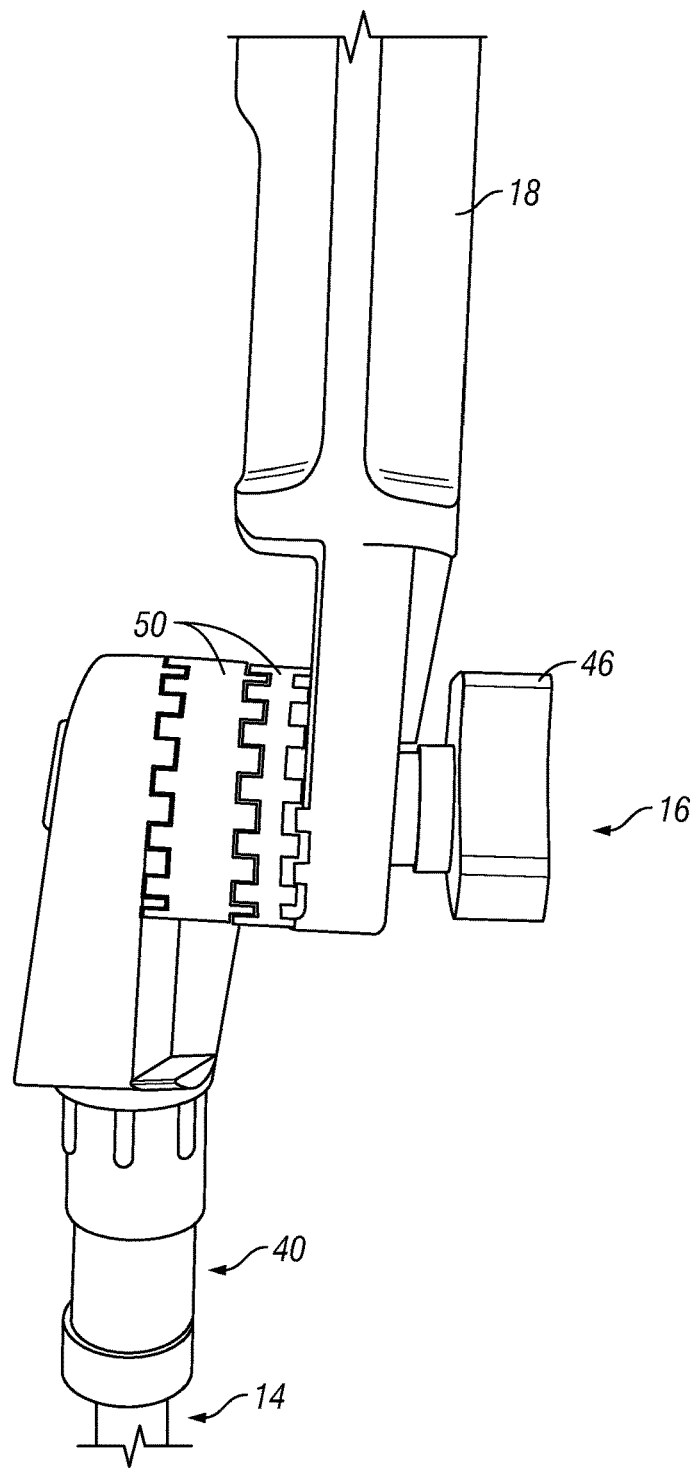
FIG. 6 is a drawing which illustrates a close-up view of a rotational joint that is preferably used to attach the base of the umbrella holder to the rest of the umbrella holder and thus provides the lowest rotational adjustment mechanism.

In one embodiment, one or more spacers 50 can be used to provide a desired amount of offset between a first half of a joint and a second half of a joint (see FIG. 6). For embodiments wherein a particular joint comprises interfacing teeth, if one or more spacers 50 are also provided in that joint, those one or more spacers 50 also preferably comprise interfacing teeth 44.

Of course, desirable results can be obtained even when interfacing teeth 44 are not provided. In one embodiment, a friction-inducing interface can be provided in one or more of joints 16, 20, and/or 26. For example, an elastomeric gasket, O-ring, or other structure can be disposed between the halves of the one or more joints such that when the two halves are forced together tightly, the gasket, o-ring or other structure is compresses and inhibits rotation between the two halves of the joint.

Figure 7A:
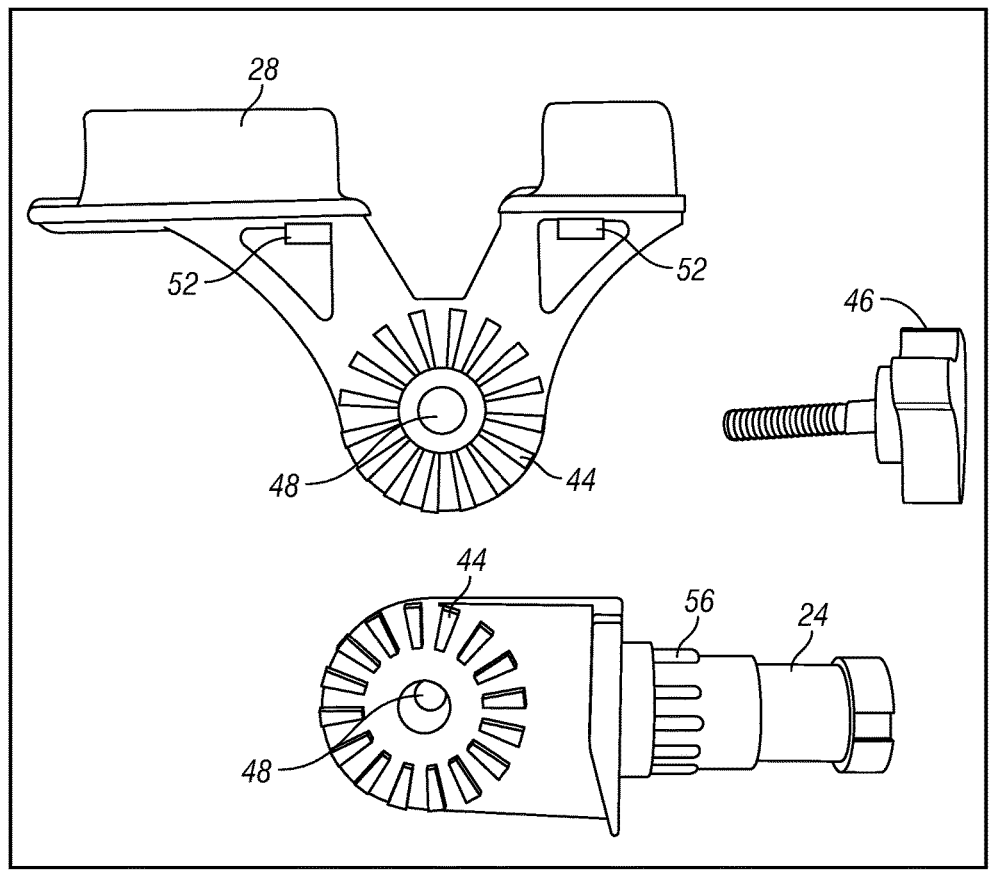
FIG. 7A is a drawing that illustrates a side-view of a disassembled third joint, having an umbrella connector incorporated into a first half thereof and a male quick connect incorporated into a second half thereof.
Figure 7B:
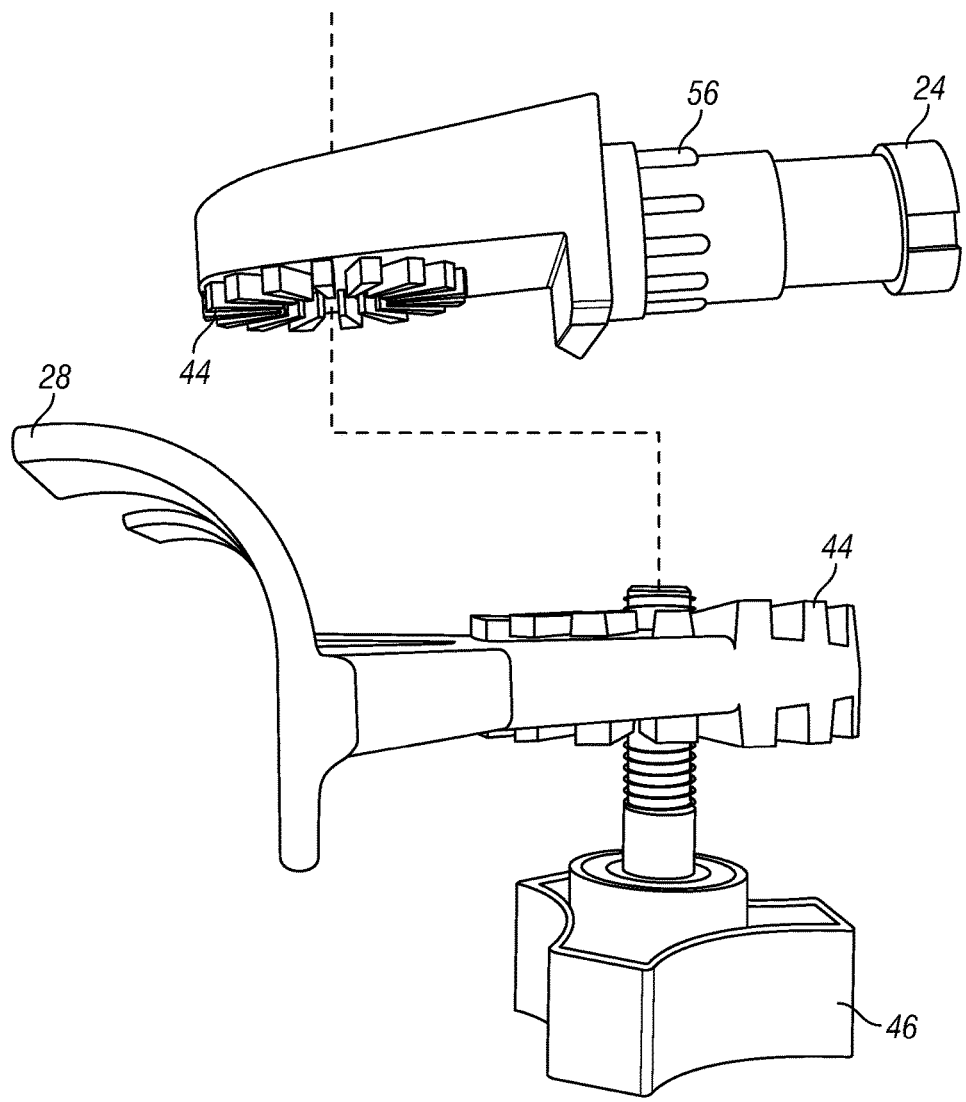
FIG. 7B is a drawing that illustrates a partially exploded view drawing of a third joint and an umbrella connector according to an embodiment of the present invention.

Although numerous manners of connection between umbrella connector 28 and a handle or other portion of an umbrella can be formed and will provide desirable results, in one embodiment, umbrella connector 28 most preferably comprises curve or trough and one or more openings 52 (see FIG. 7A). In this embodiment, an umbrella handle is preferably disposed on the curve or trough of umbrella connector 28 and cable-ties or other flexible clamping structures 54 (see FIG. 4) are passed through openings 52 such that a handle or other portion of umbrella 12 is secured to umbrella connector 28. Optionally, a central portion of the curve or trough can be omitted (see FIG. 7A). This configuration permits handles of umbrellas having a bulge to be easily accommodated by umbrella connector 28. In one embodiment one or more lengths of hook and loop tape can be used as one or more of flexible clamping structures 54. Of course, other connection mechanisms can be used and will provide desirable results, including but not limited to one or more U-bolts, a clamp including but not limited to the type of clamp illustrated in FIG. 11, or any other connection mechanism, structure, or apparatus that provides a strong connection between a portion of umbrella 12 and umbrella connector 28.

Figure 11:
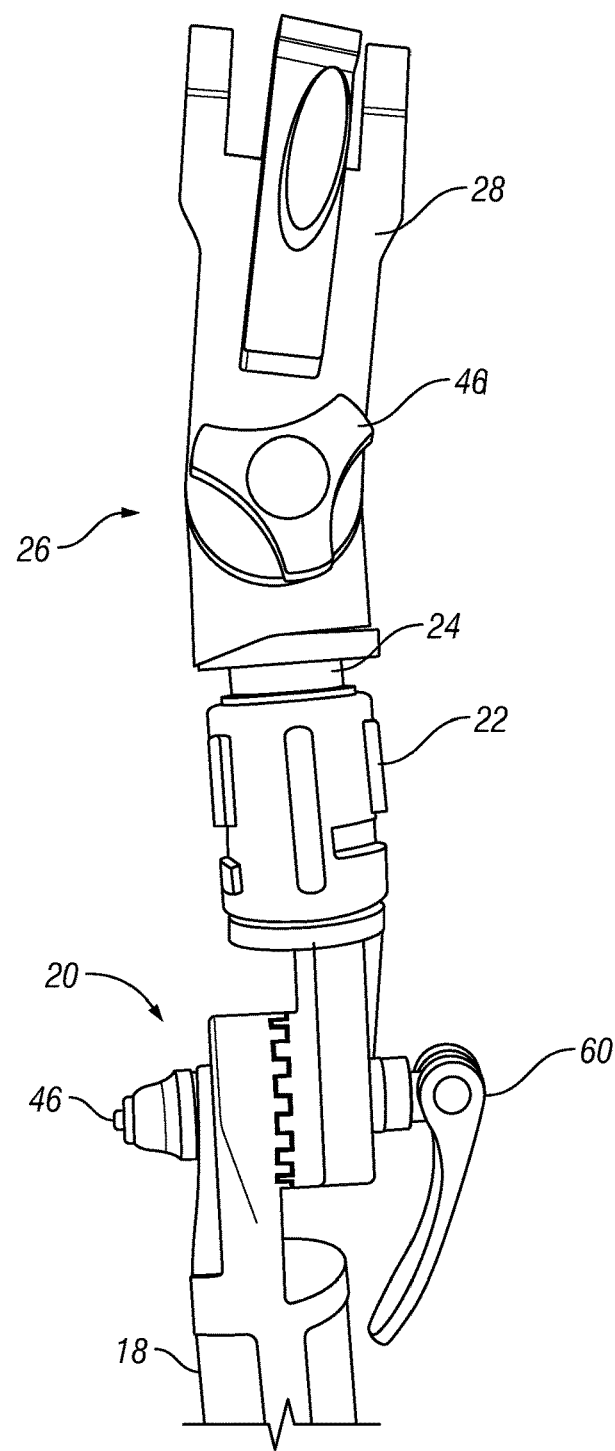
FIG. 11 is a drawing which illustrates an embodiment of the present invention wherein a fastener of a joint comprises a quick connect fastener and wherein the umbrella holder comprises a clamp.

As illustrated in FIG. 11, in one embodiment, fastener 46 can comprise lever 60, which can comprise a cam lever, including but not limited to those which are often used to quickly release a bicycle seat or tire. In one embodiment, lever 60 can comprise a threaded rod which extends therefrom. Lever 60 can also comprise a cam-shaped portion such that a user can rotate lever 60 to quickly disengage the cam, thus releasing the tension on any one or more of the joints of umbrella holder 10. Although second joint 20 is illustrated in FIG. 11 as comprising lever 60 for fastener 46, any one or more of joints 16, 20, and/or 26 can comprise lever 60. In one embodiment, a spring can be disposed between respective halves of one or more of joints 16, 20, and/or 26, such that the spring is compressed when interfacing teeth 44 of the joint are fully seated. In this configuration, the spring forces the respective halves of the joint apart when the tension from fastener 46 is released, thus facilitating the ease with which a user can adjust the joint. Optionally, interfacing teeth 44 of one or more of the joints can taper to a sharp point such that when fastener 46 is tightened, each interfacing tooth will down the side of its respective interfacing tooth on the opposing side of the joint such that all of interfacing teeth 44 will fully seat, regardless of the starting position of the joint. As also illustrated in FIG. 11, in one embodiment, umbrella connector 28 can comprise a clamp with which a portion of umbrella 12 can be held. For example, in one embodiment, a shaft of umbrella 12 can be held by a clamping mechanism including but not limited to a type of clamp illustrated in FIG. 11. Optionally, for embodiments, wherein umbrella connector 28 can comprise a clamp, the clamp can itself optionally comprise a quick releasing cam lever that is similar to or the same as lever 60.

Although the drawings illustrate most preferred embodiments of the present invention, the particular location and interconnections between the various components is not essential and desirable results can be obtained when the placement of the various components is altered. For example, although arm 18 is preferably disposed between first joint 16 and second joint 20, desirable results can still be achieved, even when the location of arm 18 is swapped with the location of quick connect halves 22 and 24. For example, in this less-desirable configuration, releasing quick connect halves 22 and 24 would cause second joint 20, arm 18, and third joint 26 to be detached from base 14. Likewise, while male quick connect 24 and female quick connect 22 are most preferably provided, such that a user can easily separate the two and leave base 14 behind while the user carries umbrella 12 around, they can optionally be provided elsewhere in umbrella holder 10. For example, in one embodiment, instead of umbrella connector 28 being connected directly to third joint 26, in one embodiment, a second arm can be provided between second joint 20 and third joint 26. In this embodiment, either male 24 or female 22 quick connect half is preferably connected to joint 26 and the other of the male or female is connected to umbrella connector 28. In this embodiment, when the male and female connectors are separated, umbrella 12 and umbrella connector 28 are preferably detached from the rest of umbrella holder 10.

Although less desirable, in one embodiment, female and male quick connect halves 22 and 24 are preferably not provided and instead, another arm is provided in their absence. Although embodiments of the present invention were found to provide desirable results when three rotational joints are used, desirable results can be achieved with more or with fewer rotational joints. Thus, in one embodiment, one of joints 16, 20, or 26 can optionally not be provided and in one embodiment, one or more joints can optionally be provided.

Figure 4:
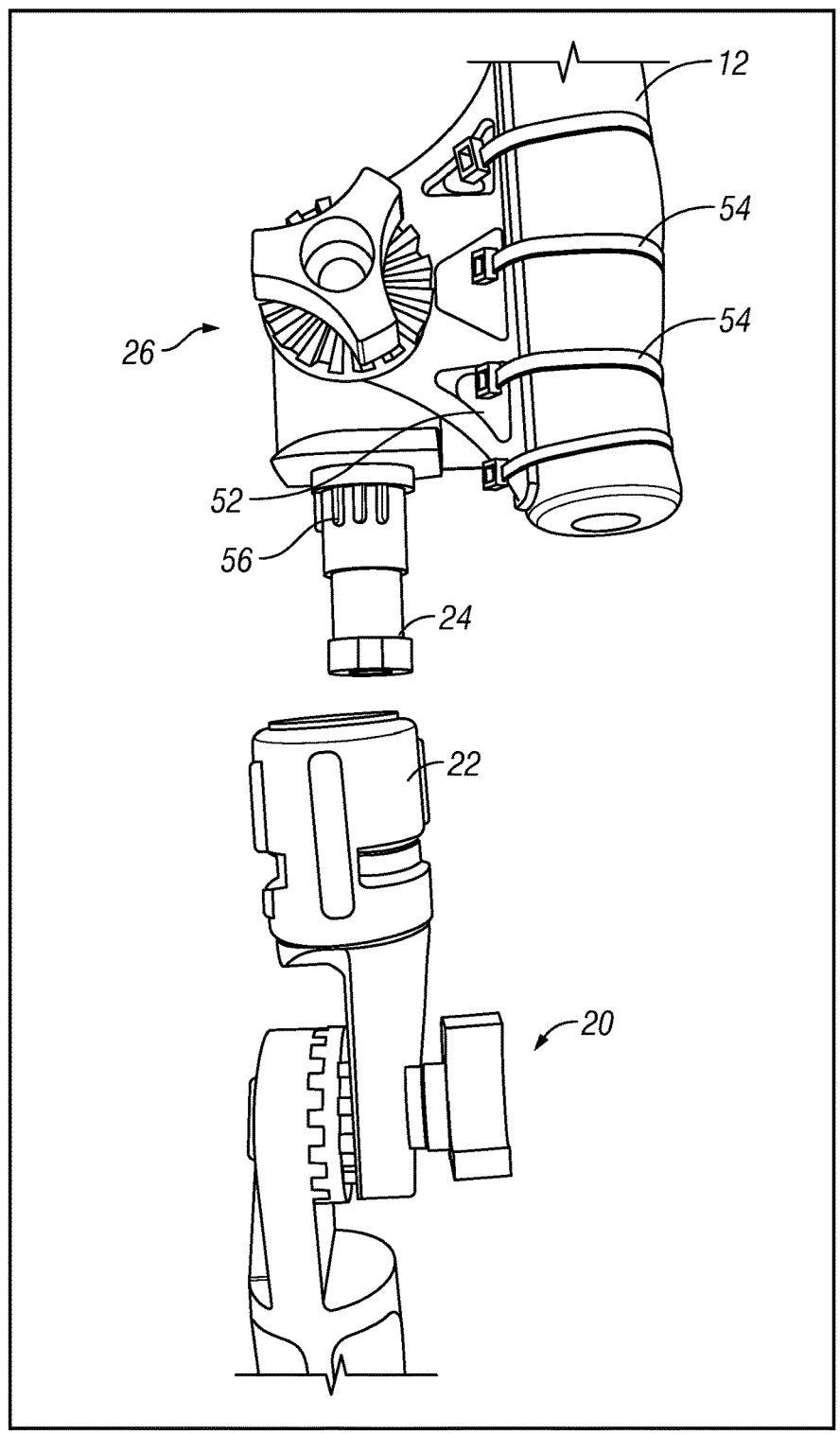
FIG. 4 is a drawing which illustrates a quick connect that is preferably disposed near to the umbrella handle such that the umbrella can quickly be detached from the rest of the holder of the present invention and thus be used by holding the umbrella in a user's hand in a conventional manner.
Figure 5:
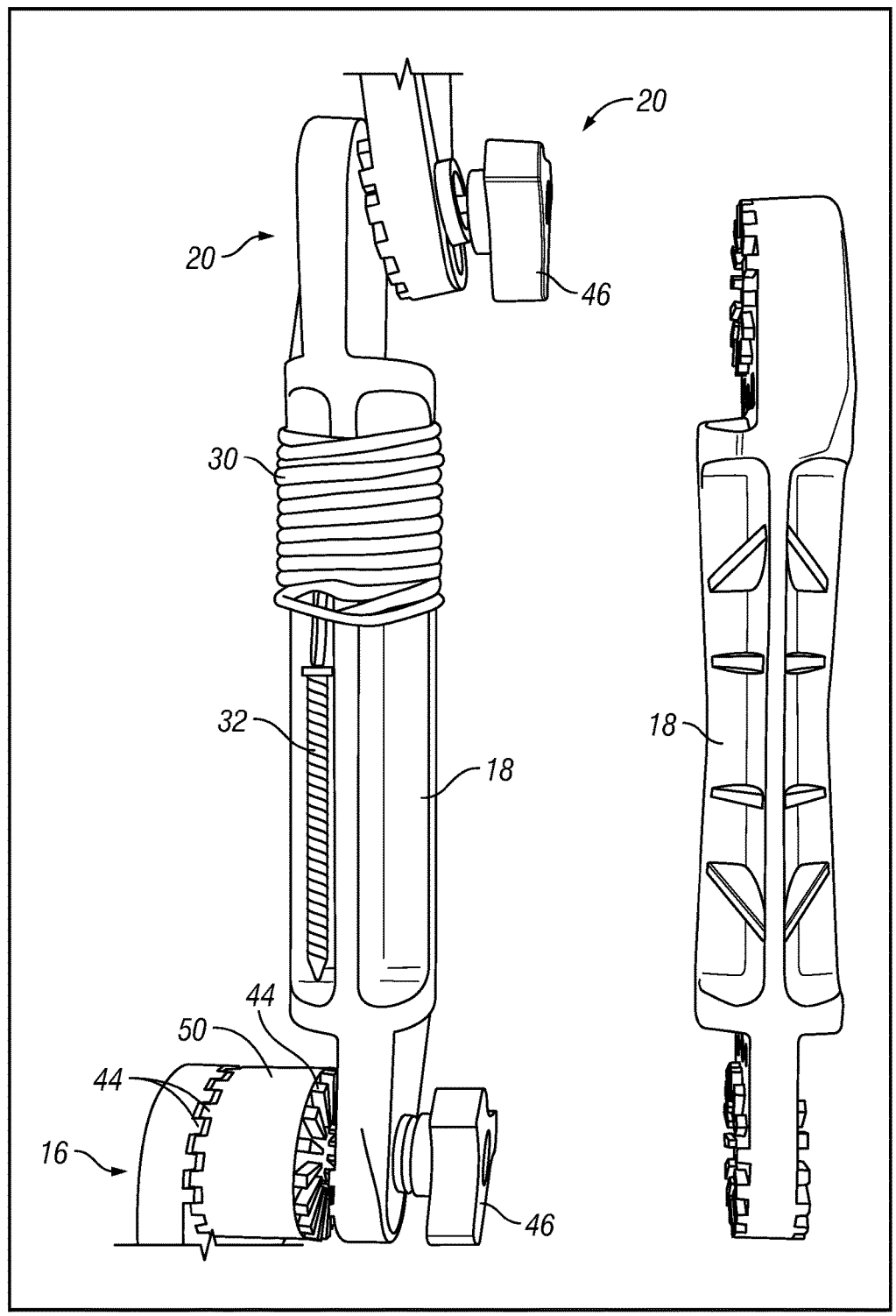
FIG. 5 is a drawing which illustrates two different configurations of an elongated connection member that can be used in the adjustable umbrella holder of the present invention.

As best illustrated in FIG. 4, male quick connect 24 most preferably comprises one or more splines 56. In this embodiment, female quick connect 22 preferably comprises one or more spline-receiving recesses formed therein such that when male quick connect 24 is secured within female quick connect 22, splines 56 preferably prevent rotation between female quick connect 22 and male quick connect 24. As used throughout this application, the term "splines" can include any structure which is capable of preventing rotation between two interfacing parts.

In one embodiment each of joints 16, 20, and 26 preferably permit a range of rotation of at least about 90 degrees, and more preferably at least about 180 degrees and more preferably at least about 270 degrees. In one embodiment, umbrella 12 can comprise an attachment mechanism incorporated therein which permits its attachment to umbrella connector 28. For example, in one embodiment, umbrella 12 can comprise a threaded member disposed on or incorporated into a lower portion of its handle and umbrella connector 28 can comprise an interfacing threaded member disposed on or otherwise incorporated therein such that the umbrella can be screwed onto and off from umbrella connector 28. Optionally, of course, a male or female quick connect can be disposed on a bottom of a handle of umbrella 12 and the interfacing female or male quick connect can be used as umbrella connector 28. In this embodiment, a second arm is preferably used in lieu of male quick connect 24 and female quick connect 22. In one embodiment, umbrella holder 10 can be adjusted such that umbrella 12 can be held at any height from touching ground level to well over a user's head when standing (i.e. to 6 feet in height or more).

In one embodiment, umbrella holder 10 can be used in conjunction with individual, personal-size umbrellas—for example, umbrellas of about 3' in diameter to about 5' in diameter. Optionally, however, umbrella holder 10 can accommodate interchangeable umbrellas of various sizes. For example, in one embodiment, umbrella holder 10 can be used with a large or group-size umbrella such that umbrella holder 10 can accommodate not only small umbrellas, but also large umbrellas having a diameter of up to about 10 feet or more in diameter to accommodate multiple people and/or to cover a large area. In one embodiment, umbrella holder 10 can be adjusted such that umbrella 12 is held directly above umbrella holder 10. In one embodiment, umbrella connector 28 can comprise a handle clamp that is configured to accommodate any commercially available umbrella.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and and/or reconfiguration of their relationships with one another.

What is claimed is:

1. An umbrella holder comprising:
   a base;
   a base connector;
   a first rotational joint, said first rotational joint connectable to said base via said base connector;
   a second rotational joint comprising interfacing halves and a fastener positioned to hold said interfacing halves together;
   a quick connect mechanism comprising a first end, said first end of said quick connect mechanism coupled to said second rotational joint;
   one or more splines disposed on said quick connect mechanism, and
   an umbrella connector, said umbrella connector comprising one of said interfacing halves of said second rotational joint such that said fastener holds said umbrella connector to another of said interfacing halves of said second rotational joint.

2. The umbrella holder of claim 1 further comprising a third rotational joint.

3. The umbrella holder of claim 2 further comprising an arm.

4. The umbrella holder of claim 3 wherein said first rotational joint is disposed between said base connector and said arm.

5. The umbrella holder of claim 3 wherein said base comprises a length which is greater than a combined length of said first, second, and third rotational joints and said arm.

6. The umbrella holder of claim 1 wherein at least one of said first rotational joint or said second rotational joint comprises interfacing teeth and is configured to lock the at least one of said first rotational joint or said second rotational joint into a plurality of different positions.

7. The umbrella holder of claim 1 further comprising an extension having ends configured to interface with respective halves of said quick connect mechanism.

8. The umbrella holder of claim 1 wherein said base comprises one or more ground spikes.

9. The umbrella holder of claim 1 further comprising an umbrella removably attachable to said umbrella connector.

10. An umbrella holder comprising:
    a first base;
    a base connector;
    a first rotational joint, said first rotational joint connectable to said first base via said base connector;
    a second rotational joint comprising interfacing halves and a fastener positioned to hold said interfacing halves together;
    a quick connect mechanism comprising interfacing parts, said quick connect mechanism comprising splines configured to prevent rotation of said interfacing parts; and
    an umbrella connector, said umbrella connector comprising a trough configured to receive a handle of an umbrella, said umbrella connector connectable to the handle of the umbrella by disposing the handle of the umbrella in said trough and securing the umbrella handle to said umbrella holder with one or more cable-ties.

11. The umbrella holder of claim 10 wherein at least one of said first rotational joint or said second rotational joint comprises interfacing teeth and a fastener and is configured to be locked into a plurality of different positions.

12. The umbrella holder of claim 10 wherein at least one of said first joint or said second joint comprises a fastener having a cam lever.

13. The umbrella holder of claim 10 further comprising a guy-line having a stake coupled thereto.

14. The umbrella holder of claim 10 further comprising an arm.

15. The umbrella holder of claim 14 further comprising a third rotational joint, said third rotational joint disposed between a first end of said arm and said quick connect mechanism and wherein a second end of said arm is connected to said first rotational joint.

16. A method for positioning an umbrella comprising:
    stepping on a base to force a pair of ground spikes into a ground surface;
    selecting at least one desired joint to manipulate from a selection of a first joint and a second joint;
    manipulating the at least one desired joint to achieve a desired orientation of the umbrella;

adjusting at least one fastener to lock the selected joint into a desired orientation; and securing interfacing portions of a quick coupler together and preventing their rotation with respect to each other via one or more splines.

17. The method of claim 16 further comprising adjusting the position of the umbrella by installing a removably positionable extension.

* * * * *